(12) United States Patent  
Chen

(10) Patent No.: US 7,542,270 B2  
(45) Date of Patent: Jun. 2, 2009

(54) DISPLAY DEVICE

(75) Inventor: Wei-Chieh Chen, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 175 days.

(21) Appl. No.: 11/773,469

(22) Filed: Jul. 5, 2007

(65) Prior Publication Data  
US 2008/0019087 A1 Jan. 24, 2008

(30) Foreign Application Priority Data  
Jul. 21, 2006 (TW) .............................. 95126824 A

(51) Int. Cl.  
*H05K 5/00* (2006.01)  
*H05K 7/00* (2006.01)

(52) U.S. Cl. ............................ 361/679.25; 248/220.22; 248/221.11; 248/223.41; 248/918; 361/679.23

(58) Field of Classification Search ................. 361/681; 248/220.22, 221.11, 223.41, 918  
See application file for complete search history.

(56) References Cited

U.S. PATENT DOCUMENTS

| 5,615,854 | A | * | 4/1997 | Nomura et al. | .......... 248/287.1 |
| 5,769,374 | A | * | 6/1998 | Martin et al. | .......... 248/221.11 |
| 6,967,632 | B1 | * | 11/2005 | Minami et al. | ............... 345/1.3 |
| 7,046,213 | B2 | * | 5/2006 | Campbell et al. | ............ 345/2.2 |
| 2007/0138360 | A1 | * | 6/2007 | Martin et al. | .......... 248/223.41 |

* cited by examiner

*Primary Examiner*—Jayprakash N Gandhi  
*Assistant Examiner*—Anthony M Haughton

(57) ABSTRACT

A display device including a casing, a guiding track, a sliding element and a holder is provided. The casing has a first surface and a second surface. The guiding track is disposed on the second surface. The sliding element is movably coupled with the guiding track. The holder is corresponding to the sliding element and disposed on the first surface for clamping an article. The sliding element and the holder are magnetically attracted with each other. The sliding element and the holder are synchronized when sliding along the guiding track for adjusting the position of the article on the display device.

14 Claims, 7 Drawing Sheets

DISPLAY DEVICE

This application claims the benefit of Taiwan application Serial No. 95126824, filed Jul. 21, 2006, the subject matter of which is incorporated herein by reference.

BACKGROUND OF THE INVENTION

1. Field of the Invention

The invention relates in general to a display device, and more particularly to a display device capable of clamping a peripheral accessory.

2. Description of the Related Art

Display device which is used for displaying various image data or text information is now widely used in people's everyday lives such as notebook computer, television or computer monitor. The structure of conventional display device is elaborated in FIG. 1.

Referring to FIG. 1, a perspective of conventional display device 900 is shown. The display device 900 includes a display panel 920 and a casing 910. The display panel 920 used for displaying a frame or text is disposed within the casing 910. When the user operates the display device 900, he or she views the frame or text displayed on the display panel 920. If the user would like to read a document placed on a desk while viewing the display panel 920a, he or she has to nod head when reading the document and raise head when viewing the display panel 920. Therefore, when reading a document, many users would use a file holder to clamp the document. By clamping the document onto a file holder and then placing the file holder vertically on the desktop, the user will save the trouble of shifting between nodding the head for reading a document and raising the head for viewing the display device.

Besides, when the user would like to incorporate a microphone and a web cam to construct a video network, he or she would also use a supporting stand to support the microphone and the web cam over the desk, so that the microphone and web cam can conveniently fetch the user's voice and image.

However, it is still not convenient to incorporate a conventional display device with a peripheral accessory. The disadvantages are as follows.

Firstly, the supporting stand occupies too much space. The supporting stand used for supporting a document, a microphone or a web cam to reach a certain height over the desktop has a certain volume. Particularly, a web cam carrying some more weight needs to be supported by a stable base, lest the web cam may topple down. Inevitable, the supporting stand will occupy too much space on the desktop.

Secondly, the desktop is messy. The supporting stand having a certain height and shape is not easy to be received and looks messy when disposed on the desk.

Thirdly, the adjustment of angle is inconvenient. When the user adjusts the angle of the supporting stand, the supporting stand may easily topple down due to the shift of the center of the weight. Consequently, the adjustable angle of the supporting stand is subjected to restrictions.

Fourthly, the adjustment of the height is inconvenient. The supporting stand supporting a peripheral accessory to a certain height is subjected to the structure of the supporting stand.

Thus, how to develop a display device facilitating the user's operation of a peripheral accessory has become an important direction of research and development.

SUMMARY OF THE INVENTION

The invention is directed to a display device. The holder and the sliding element are magnetically attracted with each other, so that the sliding element and the holder are synchronized when sliding along the guiding track. Thus, the display device has the advantages and added value of "facilitating convenience in the use of peripheral accessories", "keeping integrity in appearance", "easy disassembly" and "flexibility location of the article".

According to a first aspect of the present invention, a display device including a casing, a guiding track, a sliding element and a holder is provided. The casing has a first surface and a second surface. The guiding track is disposed on the second surface. The sliding element is movably coupled with the guiding track. The holder is corresponding to the sliding element and disposed on the first surface for clamping an article. The sliding element and the holder are magnetically attracted with each other. The sliding element and the holder are synchronized when sliding along the guiding track for adjusting the position of the article on the display device.

The invention will become apparent from the following detailed description of the preferred but non-limiting embodiments. The following description is made with reference to the accompanying drawings.

DETAILED DESCRIPTION OF THE INVENTION

First Embodiment

Figure 1:
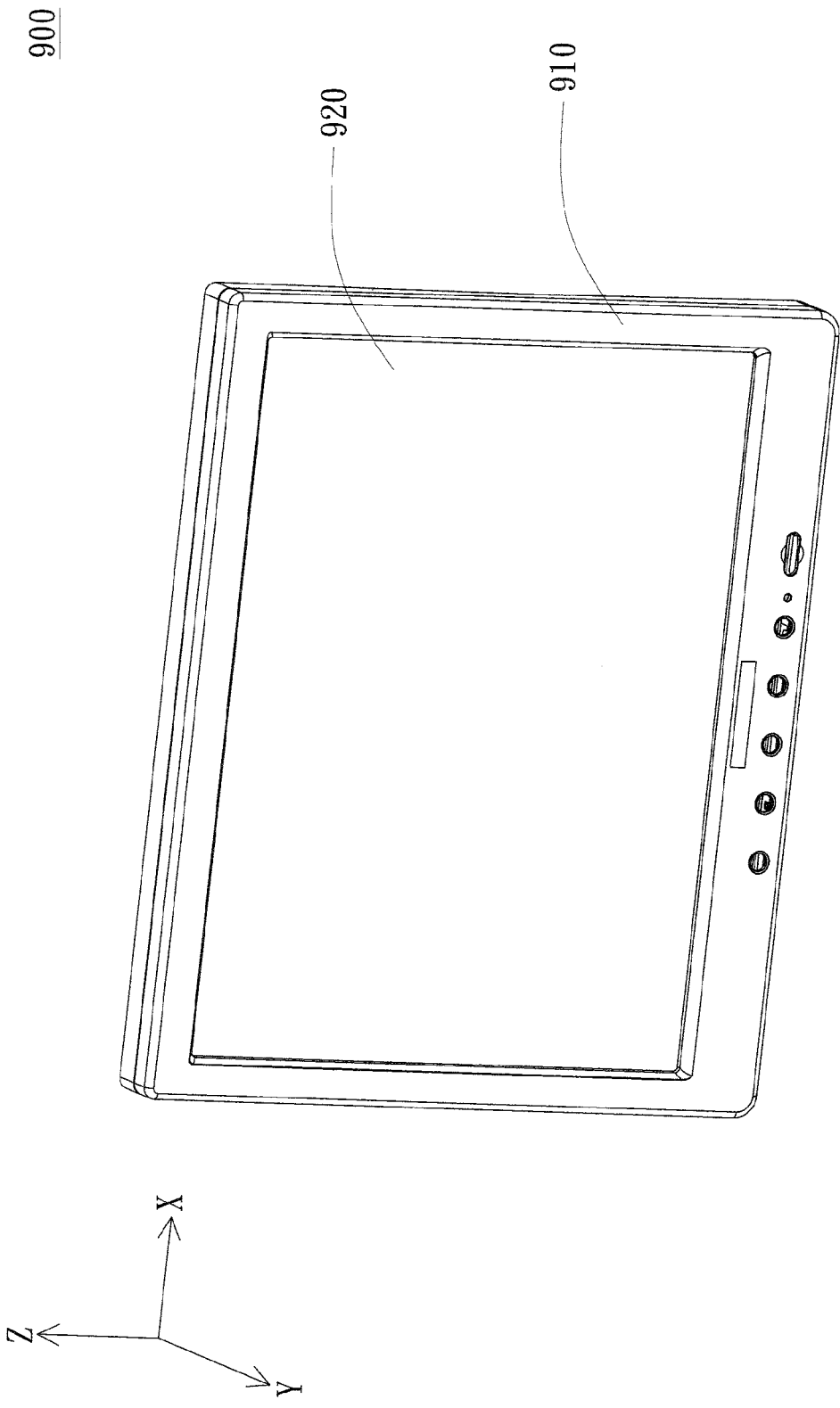
FIG. 1 (prior art) is a perspective of conventional display device.
Figure 2:
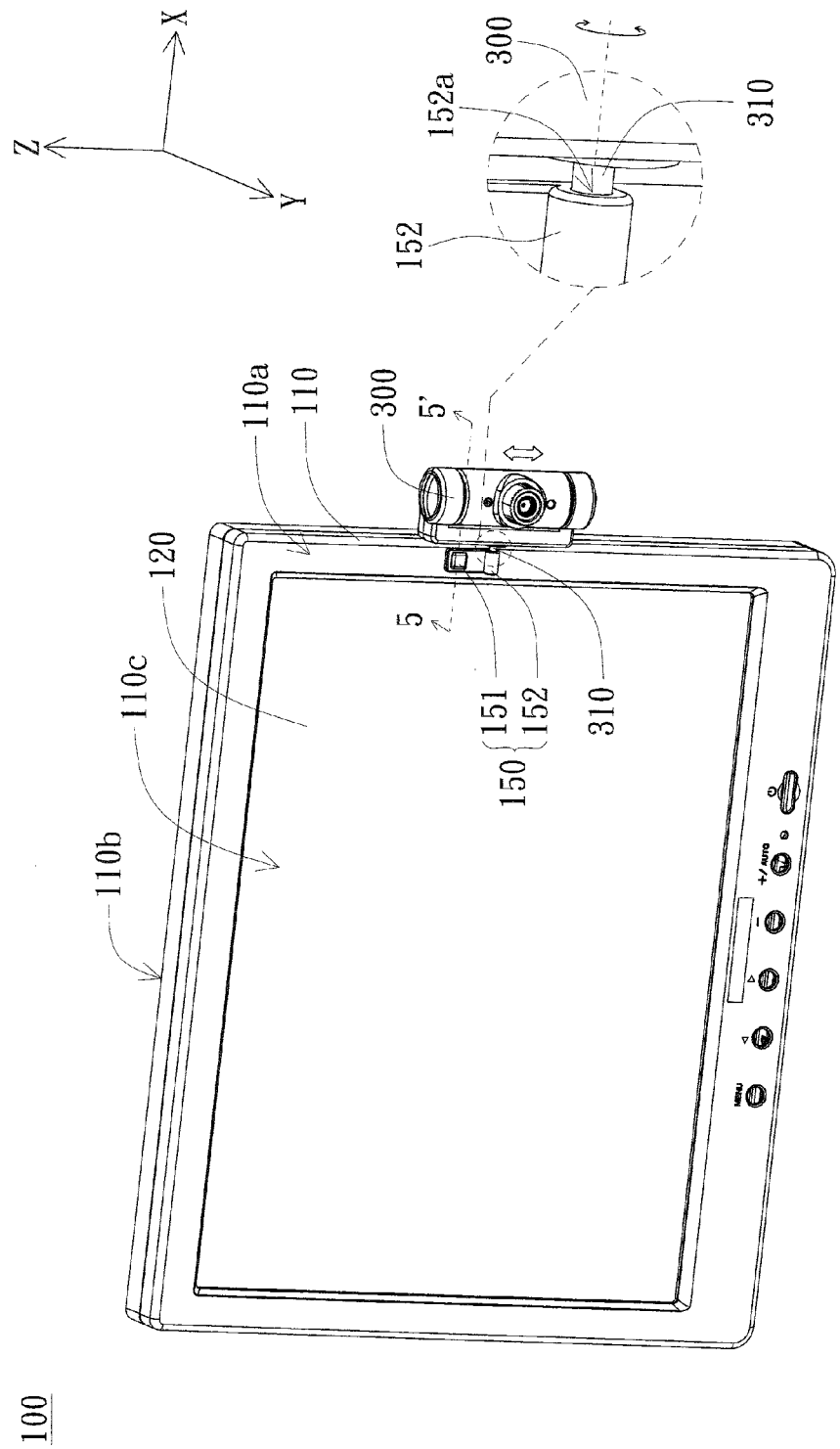
FIG. 2 is a perspective of a display device according to a first embodiment of the invention.
Figure 3:
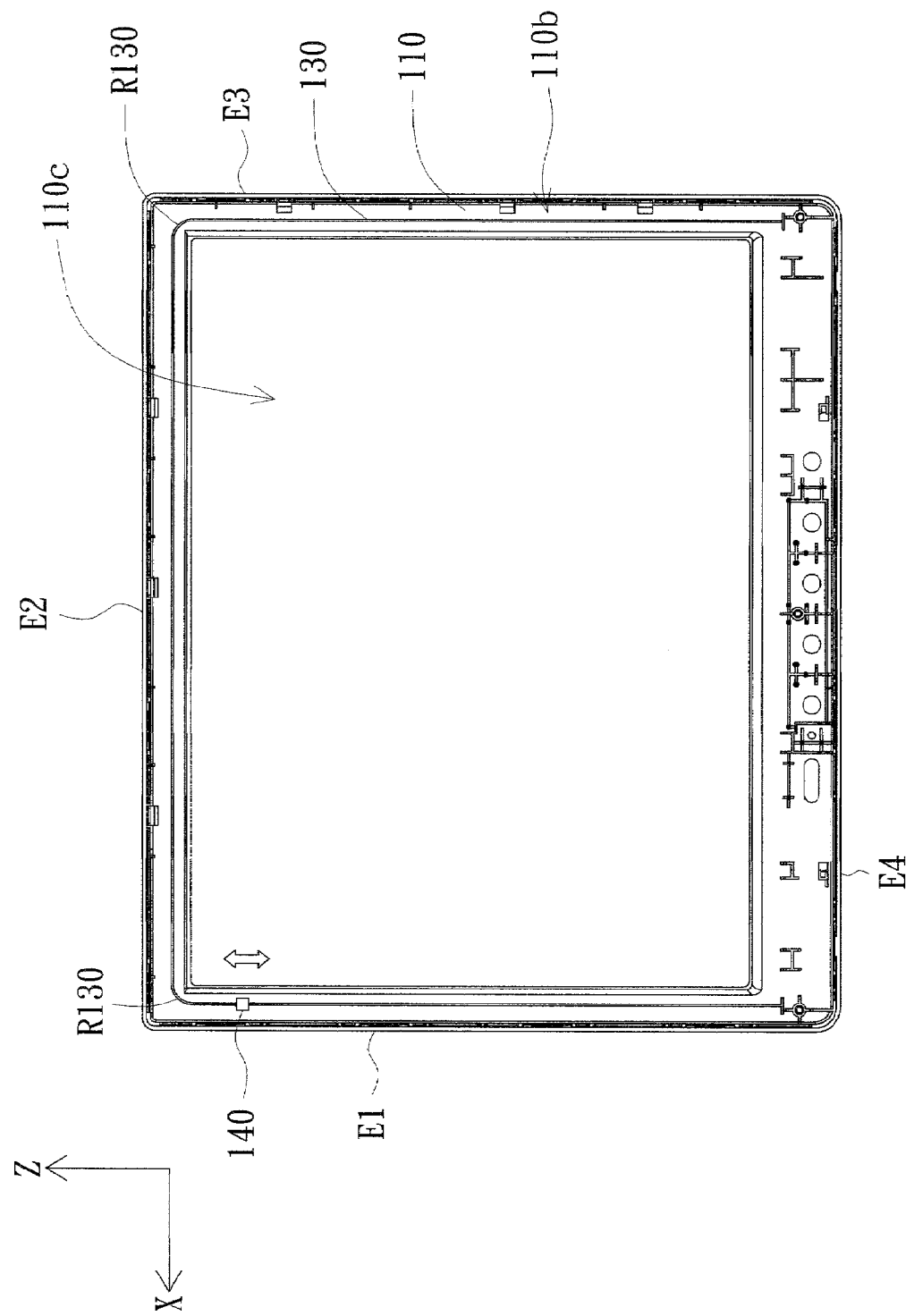
FIG. 3 is a back view of the casing of FIG. 2.

Referring to both FIG. 2 and FIG. 3. FIG. 2 is a perspective of a display device 100 according to a first embodiment of the invention. FIG. 3 is a back view of the casing 110 of FIG. 2. Examples of the display device 100 include desk-top computer monitor, notebook computer monitor and television. In the present embodiment of the invention, the display device 100 is exemplified by a desk-top computer monitor. The display device 100 includes a casing 110, a guiding track 130, a sliding element 140 (the guiding track 130 and the sliding element 140 are illustrated in FIG. 3) and a holder 150. The casing 110 has a first surface 110a and a second surface 110b (the second surface 110b is illustrated in FIG. 3). The guiding track 130 is disposed on the second surface 110b. The sliding element 140 is movably coupled with the guiding track 130. The holder 150 is corresponding to the sliding element 140 and disposed on the first surface 110a for clamping an article 300. The sliding element 140 and the holder 150 are magnetically attracted with each other and are synchronized when sliding along the guiding track 130 for adjusting the position of the article 300 on the display device 100.

The display device 100 further includes a display panel 120 disposed within the casing 110. The casing 110 has an opening 110c for exposing the display panel 120. Examples of the display panel 120 include a liquid display panel (LCD panel), an organic electroluminescent device panel (OELD panel) and a plasma display panel (PDP). In the present embodiment of the invention, the display panel 120 is exemplified by an LCD panel.

As indicated in FIG. 2, the holder 150 includes a suction board 151 and a clamping portion 152. The suction board 151 flatly pressing the first surface 110a is magnetically attracted with the sliding element 140 disposed on the inner side of the casing 110. The clamping portion 152 is for clamping an article 300. The clamping portion 152 is coupled with the suction board 151. Preferably, the clamping portion 152 and the suction board 151 are integrally formed in one piece. In the present embodiment of the invention, the article 300 is exemplified by a web cam. The article 300 has a protruded spindle 310. The clamping portion 152 has a through hole 152a, wherein the protruded spindle 310 is inserted into the through hole 152a. Moreover, the protruded spindle 310 of the article 300 rotates within the through hole 152a for enabling the article 300 to rotate with respect to the display device 100.

As indicated in FIG. 3, the second surface 110b has four outer edges E1, E2, E3, and E4. The guiding track 130 is disposed on at least one outer edge of the second surface 110b, that is, the guiding track 130 is disposed on at least one side of the opening 110c (as illustrated in FIG. 2). Therefore, when the sliding element 140 slides on at least one outer edge of the second surface 110b along the guiding track 130, the holder 150 is synchronized with the sliding element 140 and slides on at least one outer edge of the first surface 110a along the guiding track 130.

In the present embodiment of the invention, the guiding track 130 is disposed on three outer edges E1, E2, and E3 of the second surface 110b, so that the sliding element 140 and the holder 150 are synchronized when sliding on three outer edges of the display panel 120 along the guiding track 130. The guiding track 130 has two bending portions R130. The bending portions R130 are curved structures for enabling the sliding element 140 to smoothly slide between two neighboring outer edges of the second surface 110b such as between the outer edges E1 and E2 or between the outer edges E2 and E3.

As for the movable coupling structure between the guiding track 130 and the sliding element 140 is elaborated below with FIG. 4 and FIG. 5.

Figure 4:
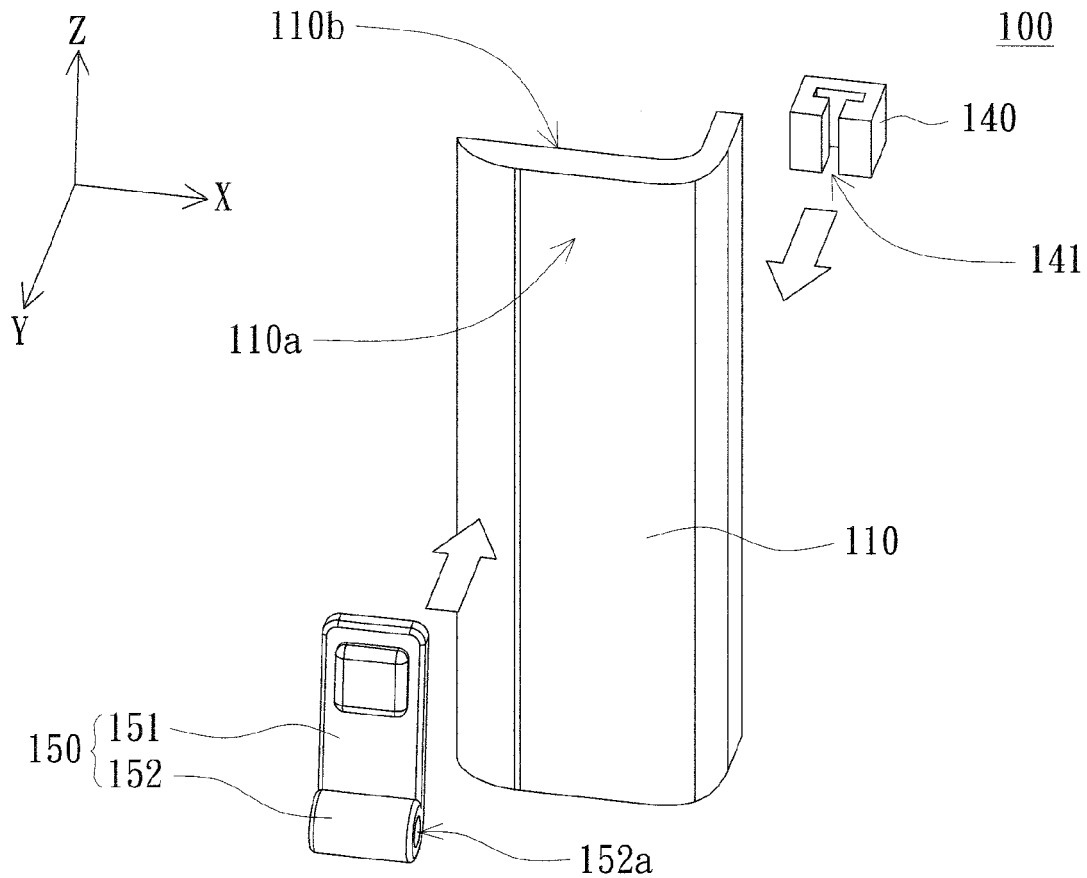
FIG. 4 is an exploded diagram of the casing, the holder and the sliding element of FIG. 2.

Referring to FIG. 4, an exploded diagram of the casing 110, the holder 150 and the sliding element 140 of FIG. 2 is shown. The suction board 151 of the holder 150 flatly presses the first surface 110a, wherein the contact surface between the first surface 110a and the suction board 151 is very smooth. The first surface 110a and the suction board 151 are coupled not by the engagement between a protrusion and a groove but by the magnetism between the sliding element 140 and the holder 150, wherein the sliding element 140 is disposed on the second surface 110b. Therefore, the appearance of the casing 110 remains integral and good looking. When the user would like to detach the holder 150, he or she only needs to remove the holder 150 from the first surface 110a. After the holder 150 is detached from the first surface 110a, there is not any protrusion or recess that may jeopardize the overall appearance left on the casing 110.

Figure 5:
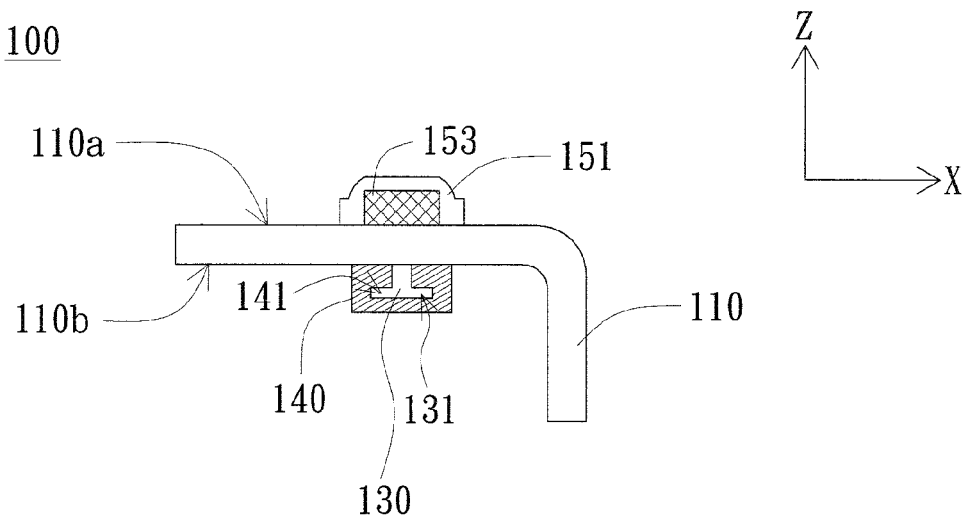
FIG. 5 is a cross-sectional view of the casing, the absorption plate, the guiding track and the sliding element of FIG. 2 along the cross-sectional line 5-5'.

Referring to both FIG. 4 and FIG. 5. FIG. 5 is a cross-sectional view of the casing 110, the suction board 151, the guiding track 130 and the sliding element 140 of FIG. 2 along the cross-sectional line 5-5'. The guiding track 130 has a first rib 131. The sliding element 140 has a first recess 141. The first recess 141 is connected to the first rib 131, so that the sliding element 140 and the holder 150 are synchronized when sliding along the direction of the guiding track 131.

The holder 150 and the sliding element 140 are magnetically attracted with each other. In the present embodiment of the invention, the suction board 151 of the holder 150 includes a magnet 153, and the material of the sliding element 140 includes iron (Fe). That is, the holder 150 possesses magnetism and the sliding element 140 possesses paramagnetism. Moreover, the casing 110 and the guiding track 130 not possessing magnetism or paramagnetism are integrally formed in one piece. Thus, the holder 150 and the sliding element 140 will not be directly sucked on the casing 110 or the guiding track 130. The holder 150 and the sliding element 140 are magnetically attracted with each other so to be retained on the casing 110 and the guiding track 130.

According to the above embodiments, the holder 150 and the sliding element 140 are respectively exemplified by a magnetic material and a paramagnetic material in the present embodiment of the invention. However, the sliding element and the holder are a magnetic material and a paramagnetic material respectively, or alternatively both the sliding element and the holder are mutually attracted magnetic materials. Any designs using the magnetic attraction between the holder and the sliding element to synchronize the sliding element with the holder when sliding along the guiding track are within the technology of the invention.

Figure 6:
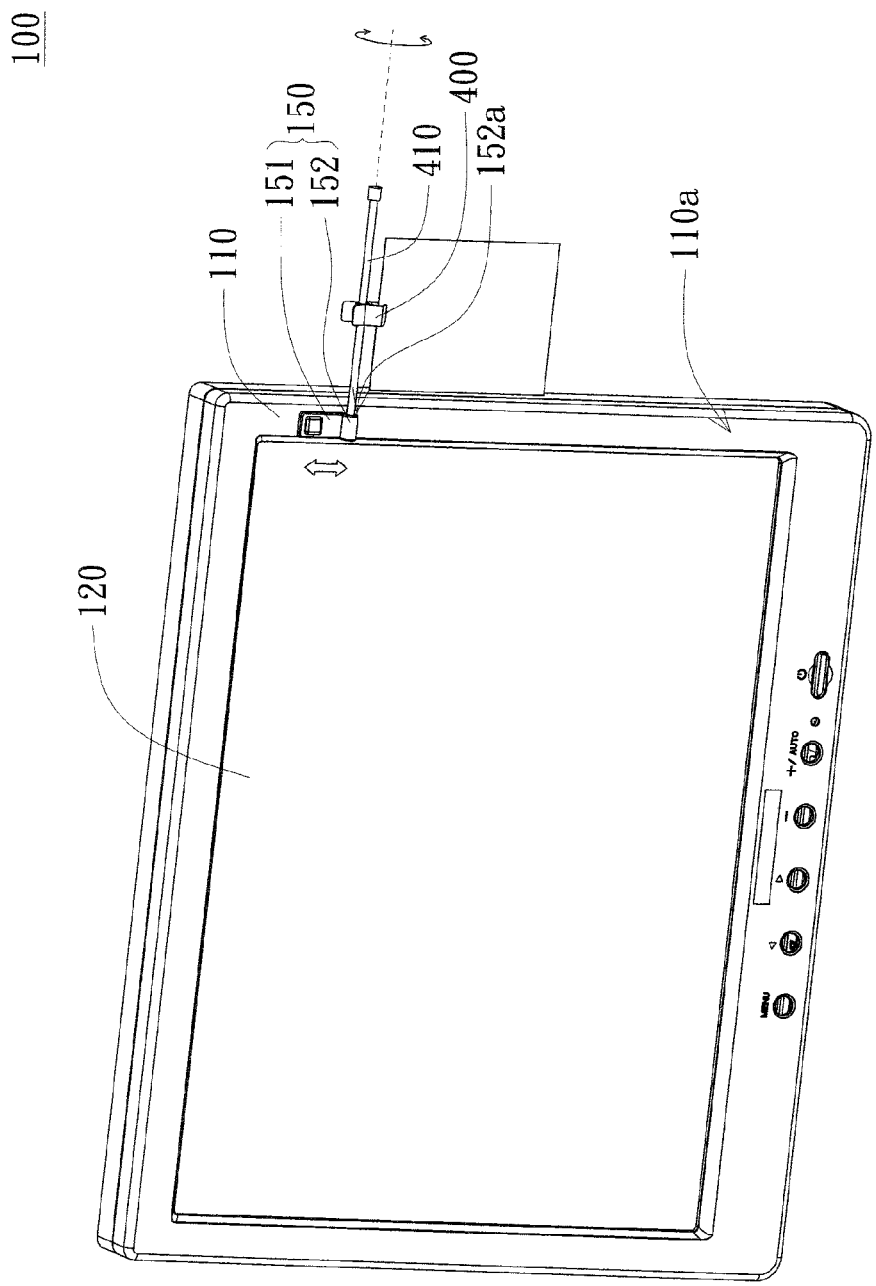
FIG. 6 is a perspective of the holder of FIG. 2 clamping an article.
Figure 7:
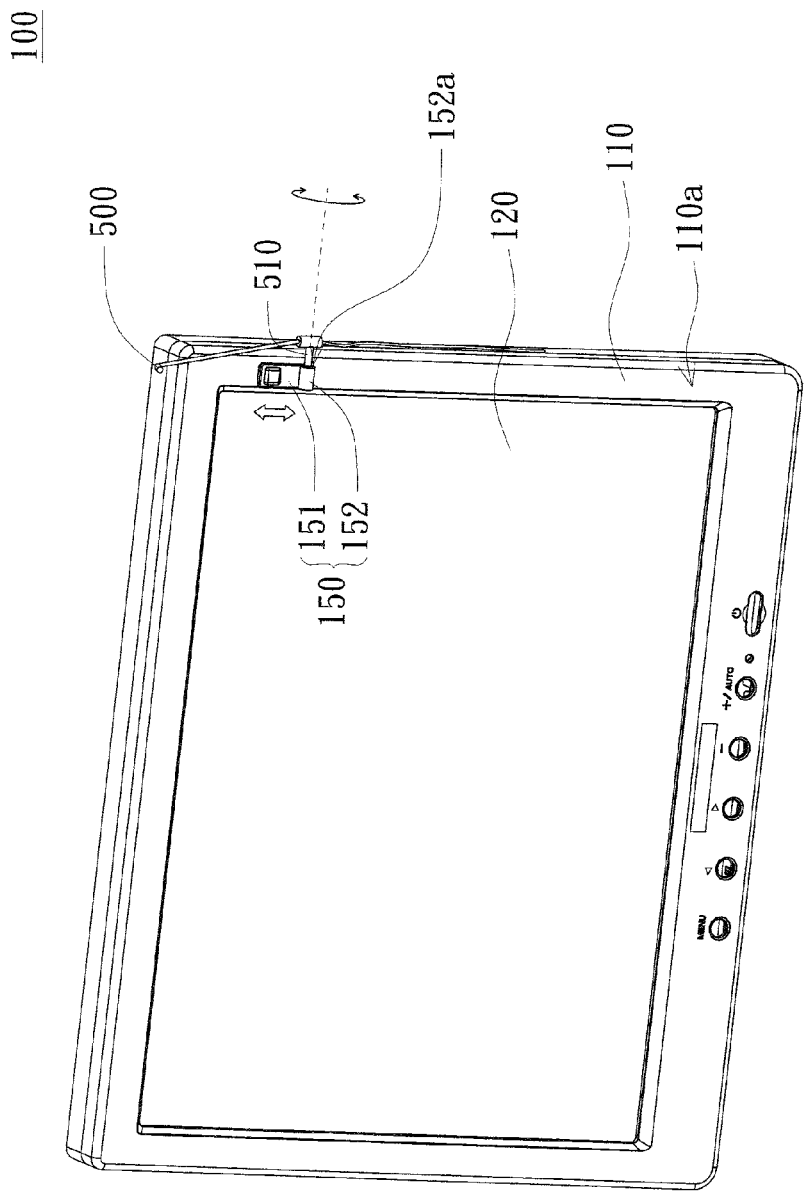
FIG. 7 is a perspective of the holder of FIG. 2 clamping another article.
Figure 8:
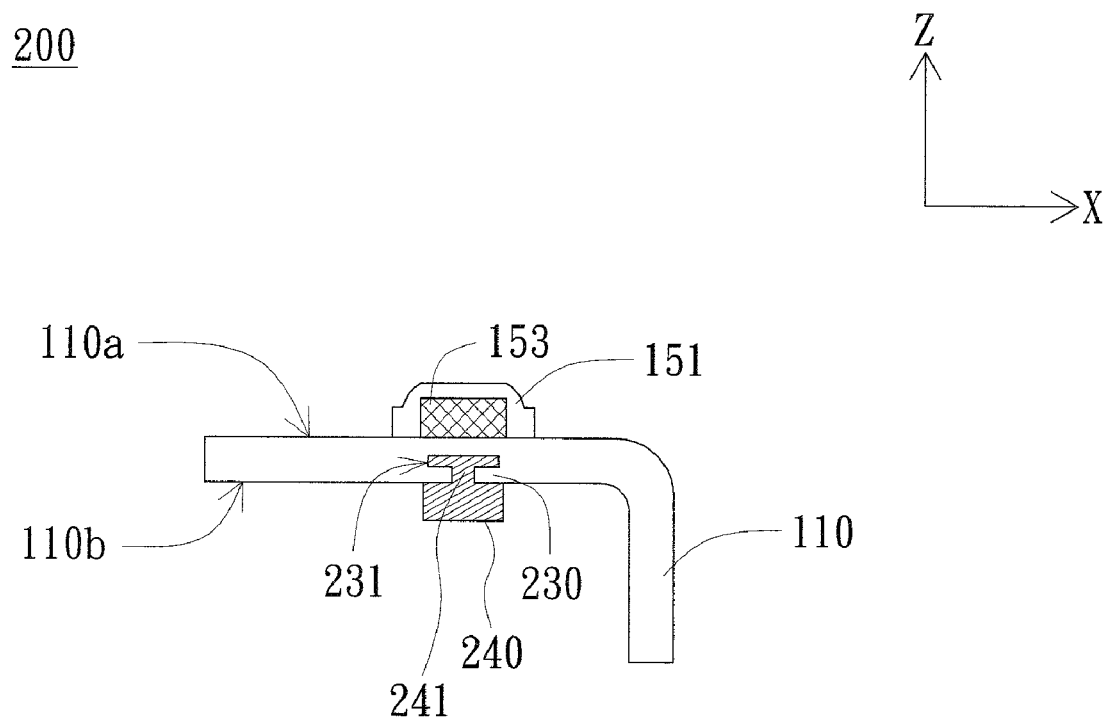
FIG. 8 is a structural perspective of the casing, the absorption plate, the guiding track and the sliding element of the display device according to a second embodiment of the invention.

Referring to FIG. 6 and FIG. 7. FIG. 6 is a perspective of the holder 150 of FIG. 2 clamping an article 400. FIG. 7 is a perspective of the holder 150 of FIG. 2 clamping an article 500. In above embodiments of the invention, the article 300 is exemplified by a web cam. However, examples of the article of the invention include paper clamper, microphone or other peripheral accessories. In FIG. 6, the article 400 is a paper clamper. In FIG. 7, the article 500 is a microphone. The articles 400 and 500 respectively have a protruded spindle 410 and a protruded spindle 510 inserted into the through hole 152a. Moreover, the protruded spindles 410 and 510 rotate within the through hole 152a respectively for enabling the articles 400 and 500 to rotate with respect to the display device 100. Any designs using the magnetic attraction between the holder and the sliding element to synchronize the sliding element with the holder when sliding along the guiding track are within the technology of the invention Second Embodiment The display device 200 of the present embodiment of the invention differs with the display device 100 of the first embodiment in the structures of the guiding track 230 and the sliding element 240, and the remaining similarities are not repeated here. Referring to FIG. 8, a structural perspective of the casing 110, the suction board 151, the guiding track 230 and the sliding element 240 of the display device 200 according to a second embodiment of the invention is shown. The guiding track 230 has a second recess 231. The sliding element 240 has a second rib 241. The second rib 241 is embedded into the second recess 231, so that the sliding element 240 and the holder 230 are synchronized when sliding along the guiding track 230.

According to the display device disclosed in the above embodiments of the invention, the holder and the sliding element are magnetically attracted with each other, so that the sliding element and the holder are synchronized when sliding along the guiding track. The display device of the invention has the following advantages and added values.

Firstly, convenience in the use of a peripheral accessory is enhanced. For example, a peripheral accessory such as web cam, microphone or paper clamper can be directly clamped to the holder; therefore the user does not need to find a suitable location for the peripheral accessory. Furthermore, the peripheral accessory is disposed near the display panel and within the vision of the user, largely saving the user the trouble of nodding and raising his or her head as well as the trouble of changing the view angle.

Secondly, the appearance remains integral. The suction board is retained by the magnetism between the sliding element and the holder. The casing and the holder are coupled without using any protrusion or groove, so that the appearance of the casing remains integral and good looking.

Thirdly, the detachment is easy. When the user would like to detach the holder, he or she can easily remove the holder from the first surface without using any tools such as a screw driver.

Fourthly, the disposition of peripheral accessory is flexible. The holder and the sliding element are synchronized when sliding along the guiding track, so that a peripheral accessory together with the holder can be moved to the left, to the right or to the top of the display panel. Moreover, the height and rotation angle of a peripheral accessory can be easily adjusted, largely increasing the convenience of use.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a casing having a first surface and a second surface;
   a guiding track disposed on the second surface;
   a sliding element movably coupled with the guiding track; and
   a holder corresponding to the sliding element and disposed on the first surface for clamping an article;
   wherein, the sliding element and the holder are magnetically attracted with each other, so that the sliding element and the holder are synchronized when sliding along the guiding track for adjusting the position of the article on the display device.

2. The display device according to claim 1, wherein the sliding element possesses magnetism and the holder possesses paramagnetism.

3. The display device according to claim 1, wherein the holder possesses magnetism and the sliding element possesses paramagnetism.

4. The display device according to claim 1, wherein the sliding element and the holder both possess magnetism, the two opposite sides between the sliding element and the holder are magnetically attracted with each other.

5. The display device according to claim 1, wherein the guiding track neighbors at least one outer edge of the second surface.

6. The display device according to claim 5, wherein the guiding track neighbors three outer edges of the second surface.

7. The display device according to claim 6, wherein the guiding track has a plurality of bending portions which are curved structures for enabling the sliding element to slide between two neighboring outer edges of the second surface.

8. The display device according to claim 1, wherein the guiding track has a first rib, the sliding element has a first recess, and the first recess is connected to the first rib, so that the sliding element and the holder are synchronized when sliding along the guiding track.

9. The display device according to claim 1, wherein the guiding track has a second recess, the sliding element has a second rib, and the second rib is embedded into the second recess, so that the sliding element and the holder are synchronized when sliding along the guiding track.

10. The display device according to claim 1, wherein the holder comprises:
    an suction board flatly pressing the first surface, wherein the suction board and the sliding element are magnetically attracted with each other; and
    a clamping portion coupled with the suction board for clamping the article.

11. The display device according to claim 10, wherein the article has a protruded spindle, the clamping portion has a through hole, and the protruded spindle is inserted into the through hole.

12. The display device according to claim 11, wherein the protruded spindle rotates within the through hole for enabling the article to rotate with respect to the display device.

13. The display device according to claim 1, wherein the casing and the guiding track are integrally formed in one piece.

14. The display device according to claim 1, wherein the casing and the guiding track do not possess magnetism or paramagnetism.

* * * * *